United States Patent
Cho et al.

(10) Patent No.: US 10,142,955 B2
(45) Date of Patent: Nov. 27, 2018

(54) APPARATUS AND METHOD FOR CONTROLLING DEVICE TRIGGERING IN A MOBILE COMMUNICATION NETWORK

(75) Inventors: Song Yean Cho, Seoul (KR); Ji Cheol Lee, Suwon-si (KR); Beom Sik Bae, Suwon-si (KR); Sang Soo Jeong, Suwon-si (KR)

(73) Assignee: Samsung Electronic Co., Ltd., Suwon-si (KR)

(*) Notice: Subject to any disclaimer, the term of this patent is extended or adjusted under 35 U.S.C. 154(b) by 0 days.

(21) Appl. No.: 14/131,354

(22) PCT Filed: Jul. 6, 2012

(86) PCT No.: PCT/KR2012/005393
§ 371 (c)(1),
(2), (4) Date: Jan. 7, 2014

(87) PCT Pub. No.: WO2013/006015
PCT Pub. Date: Jan. 10, 2013

(65) Prior Publication Data
US 2014/0148158 A1  May 29, 2014

(30) Foreign Application Priority Data
Jul. 7, 2011 (KR) .................. 10-2011-0067315

(51) Int. Cl.
*H04W 60/04* (2009.01)
*H04W 28/14* (2009.01)
(Continued)

(52) U.S. Cl.
CPC ............. *H04W 60/04* (2013.01); *H04W 4/20* (2013.01); *H04W 28/14* (2013.01); *H04W 4/50* (2018.02); *H04W 68/005* (2013.01)

(58) Field of Classification Search
CPC .................. H04W 3/00; H04W 4/00
(Continued)

(56) References Cited

U.S. PATENT DOCUMENTS 8,316,457 B1 * 11/2012 Paczkowski et al. .......... 726/27
8,825,046 B2 *  9/2014 Borran ................ H04W 52/242
                                                       455/434
(Continued)

FOREIGN PATENT DOCUMENTS

KR   10-2004-0040595 A    5/2004
KR   10-2007-0107546 A   11/2007
(Continued)

OTHER PUBLICATIONS

MTC Device Trigger Considering Time Controlled Feature, SA WG2 Temporary Document from SA WG2 Meeting #86, Jul. 11-15, 2011, S2-113362, Naantali, Finland.
(Continued)

Primary Examiner — Gary Lafontant
(74) Attorney, Agent, or Firm — Jefferson IP Law, LLP

(57) ABSTRACT

A method for controlling device triggering in a mobile communication system includes registering a default urgent level of a terminal when the terminal is connected, receiving a device trigger register including urgent level information transmitted from an application server, and setting the received urgent level in a packet filter, and comparing, upon reception of a downlink data packet from the application server, a default urgent level and an urgent level of the application server to determine whether to transmit a downlink data notification. The method further includes receiving a device trigger register including wait time information transmitted from an application server, and then setting the received wait time in the packet filter, and buffering during the wait time upon reception of the downlink data packet
(Continued)

from the application server, and then determining a downlink data notification transmission upon expiration of the wait time.

8 Claims, 6 Drawing Sheets

(51) Int. Cl.
*H04W 4/20* (2018.01)
*H04W 68/00* (2009.01)
*H04W 4/50* (2018.01)

(58) Field of Classification Search
USPC ...... 455/435.1, 518; 709/206, 228; 370/352; 726/27
See application file for complete search history.

(56) References Cited

U.S. PATENT DOCUMENTS

| | | | |
|---|---|---|---|
| 2006/0253538 A1* | 11/2006 | Jung et al. | 709/206 |
| 2008/0137646 A1* | 6/2008 | Agarwal et al. | 370/352 |
| 2008/0162705 A1* | 7/2008 | Cai | H04W 8/20 709/228 |
| 2010/0020812 A1* | 1/2010 | Nakamura | H04L 45/302 370/401 |
| 2010/0260148 A1 | 10/2010 | Huoviala et al. | |
| 2010/0312852 A1 | 12/2010 | Kamga et al. | |
| 2011/0086628 A1* | 4/2011 | Karuturi et al. | 455/418 |

FOREIGN PATENT DOCUMENTS

| | | |
|---|---|---|
| KR | 10-2009-0092823 A | 9/2009 |
| KR | 10-2010-0045515 A | 5/2010 |

OTHER PUBLICATIONS

Device Triggering, 3GPP TSG SA WG2 Meeting #85, May 16-20, 2011, TD S2-112572, Xi'An, China.

3rdGeneration Partnership Project; Technical Specification Group Services and System Aspects; System Improvements for Machine-Type Communications; (Release 11), Jun. 2011, 3GPP TR 23.888 V1.3.0, 3GPP, Sophia Antipolis, France.

* cited by examiner

APPARATUS AND METHOD FOR CONTROLLING DEVICE TRIGGERING IN A MOBILE COMMUNICATION NETWORK

TECHNICAL FIELD

The present invention relates to a data packet communication apparatus and method of a mobile communication network and, in particular, to a device-triggering control apparatus and method for connecting to an external server.

BACKGROUND ART

In the mobile communication, device triggering is the means by which a server located outside a Mobile Operation Network indicates necessity of communication such that a terminal connects to the server. The device triggering has to be available both cases when the terminal is in the online state and has data connection and when the terminal is in the online state but has no data connection.

FIG. 1 is a diagram illustrating architecture of a mobile operator network interworking with a circuit network for providing Short Message Service (SMS), and FIG. 2 is a diagram illustrating a mobile communication network including the packet service network and an application server. Referring to FIGS. 1 and 2, the solution making it possible to fulfilling the requirements of the current device triggering is an SMS-based push service. That is, if the information on the external server through SMS, the terminal which receives the SMS establishes a Packet Data Network (PDN) connection to connect to the external server. However, the SMS-based connection method uses a Circuit Switched network, there is a problem in that the LTE system using only the Packet Switched (PS) network has to interwork with the legacy Circuit Switched network. There is therefore a need of a method for supporting device triggering only with the Packet Switched network without interworking with the Circuit Switched network.

The device triggering in the packet network may causes signaling overhead. That is, if several application servers located at external networks request for device trigger service to communicate small amount of data, this causes frequent state transitions of the terminal, resulting in signaling overhead of the mobile communication network. For example, if a terminal which has received a paging for device triggering of an application connects to an application server to exchanged small amount of data and enters the idle state and, afterward, if the paging for device triggering associated with another application server is received, the terminal transitions to the active state to exchange small amount of data and then transitions to the idle state, repeatedly. The signaling overhead problem is exemplified as shown in FIG. 3. FIG. 3 is a graph illustrating an exemplary signaling overhead increment caused by state transition. As shown in FIG. 3, the signaling overhead is the problem caused by the application server using notification for the data terminal (e.g. smartphone)

DISCLOSURE OF INVENTION

Technical Problem

The mobile communication system configures a packet filter for controlling device triggering and controls, when there is any device trigger request, the connection between the external server and the terminal selectively based on the information configured to the packet filter. That is, an embodiment of the present invention proposes a method of configuring, at the mobile communication network, packet filters for device triggering levels or timings per application server and analyzing, when a device trigger request is received from the corresponding application server, the packet filter to determine whether to perform downlink data notification.

An embodiment of the present invention proposes a method of configuring the packet filter of a serving gateway based on tolerant level (or urgent level), wait time, the data packet amount buffered at the serving gateway and/or the load status of MME and analyzing, when device trigging is detected, the packet filter for the corresponding application server to determine whether to send downlink data notification.

Solution to Problem

In accordance with an aspect of the present invention, a device triggering method of a mobile communication system includes registering, when a terminal attaches, a default urgent level of corresponding terminal, receiving a device trigger register including urgent level information from an application server, configuring a packet filter with the urgent level, determining, when a downlink data packet is received, whether to transmit a downlink data notification by comparing a urgent level of the application server with the default urgent level.

At this time, the determining of whether to transmit the downlink data notification includes comparing the urgent level of the application server with the default urgent level, notifying, when the urgent level is higher than the default urgent level, the downlink packet, buffering and transmitting, when the terminal attaches, the data packet to the terminal, and buffering, when the urgent level is lower than the default urgent level, the packet.

In accordance with an aspect of the present invention, a device triggering control method of the mobile communication system receives a device trigger register including wait time information from an application server, configuring a packet filter with the wait time, buffering downlink data packets transmitted by the application server during the wait time, and determining, when the wait time expires, downlink data notification transmission.

The determining of the downlink data notification transmission includes starting, when no buffered data exists in receiving the data packet, a downlink data notification timer, buffering, when buffered data exists, buffers the received data packet, notifying, when the downlink data notification timer expires, the UE of the downlink packet, and transmitting, when the terminal attaches, the buffered data.

In accordance with an aspect of the present invention, a device triggering control apparatus of a mobile communication system includes terminals, application servers which transmit device trigger registers including urgent level information and generate downlink data packets, a serving gateway, and a core network which configures a packet filter of the serving gateway with a default urgent level and urgent levels transmitted by the application servers, comparing, when a downlink data packet is received from an application server, the urgent level of the corresponding application server with the default urgent level to determine whether to transmit a downlink data notification to the terminal.

In accordance with an aspect of the present invention, a device triggering control apparatus of a mobile communication system includes terminals, application servers which transmit device trigger registers including wait time information and generate downlink data packets, a serving gateway, and a core network which configures a packet filter of the serving gateway with the wait times transmitted by the application servers, buffers downlink packets transmitted by the application servers during the wait time, and determine, when the wait time expires, transmitting a downlink data notification.

Advantageous Effects of Invention

The device-triggering control apparatus and method of the present invention processes downlink data packets using the packet filter configured per application server so as to avoid frequent state transitions of the terminal for data packet download and thus reduce signaling overhead of the mobile communication network.

MODE FOR THE INVENTION

Figure 1:
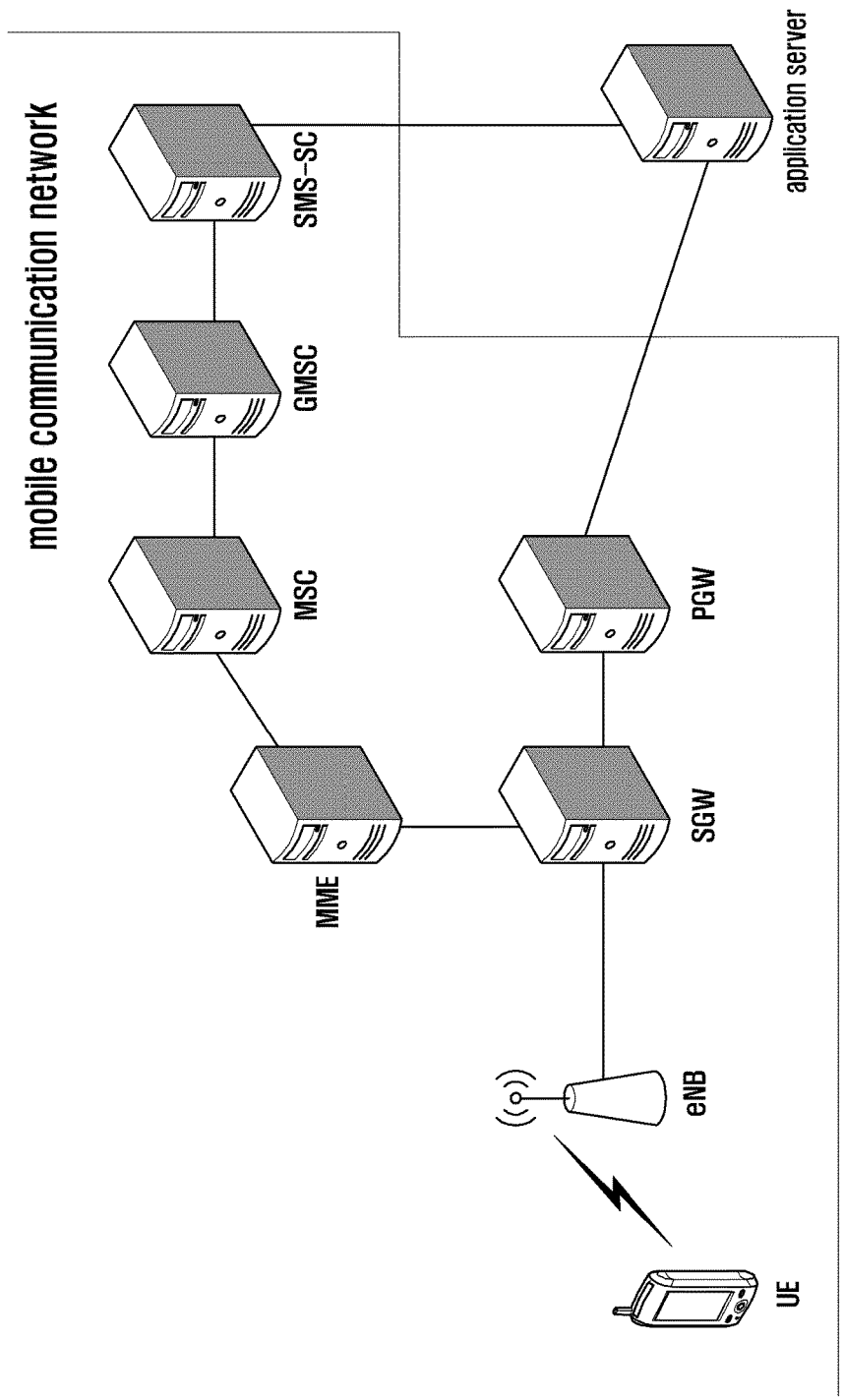
FIG. 1 is a diagram illustrating architecture of a mobile operator network interworking with a circuit network for providing Short Message Service (SMS)
Figure 2:
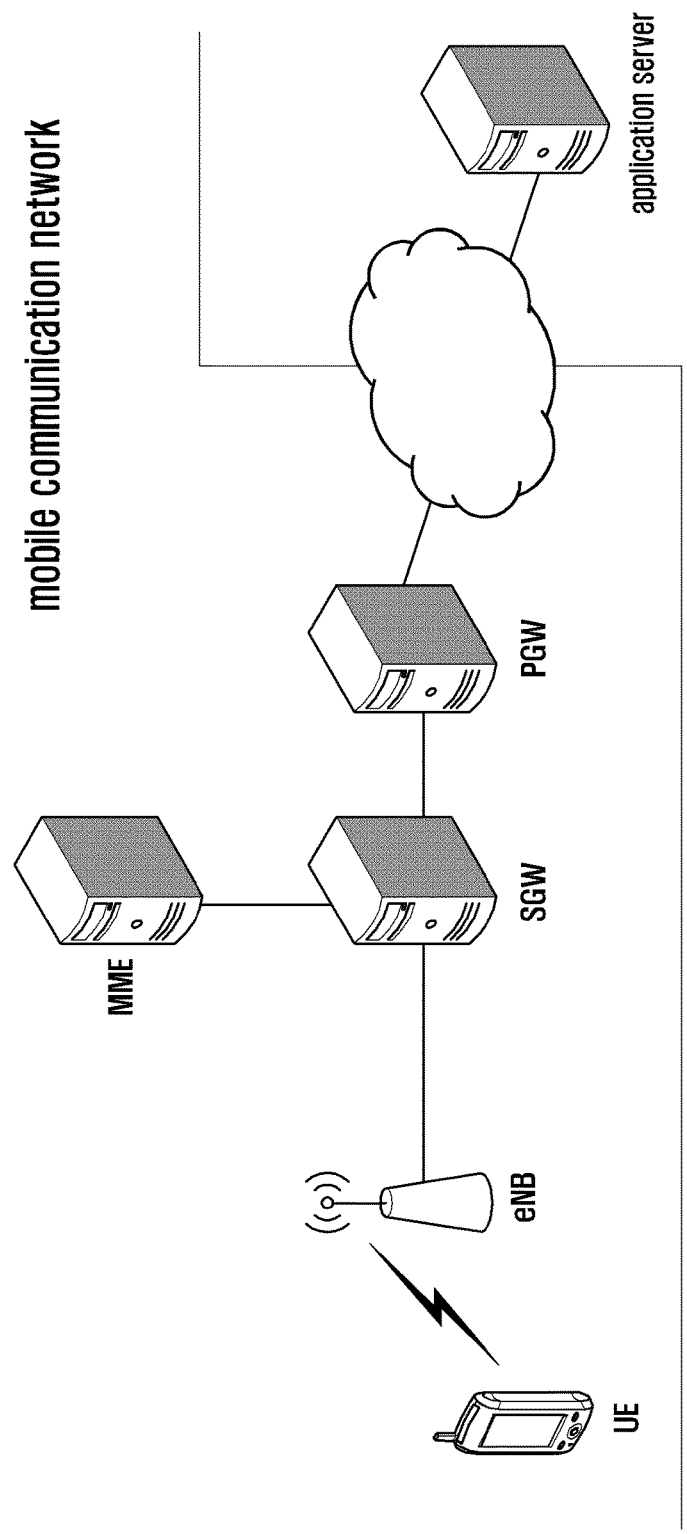
FIG. 2 is a diagram illustrating a mobile communication network including the packet service network and an application server.
Figure 3:
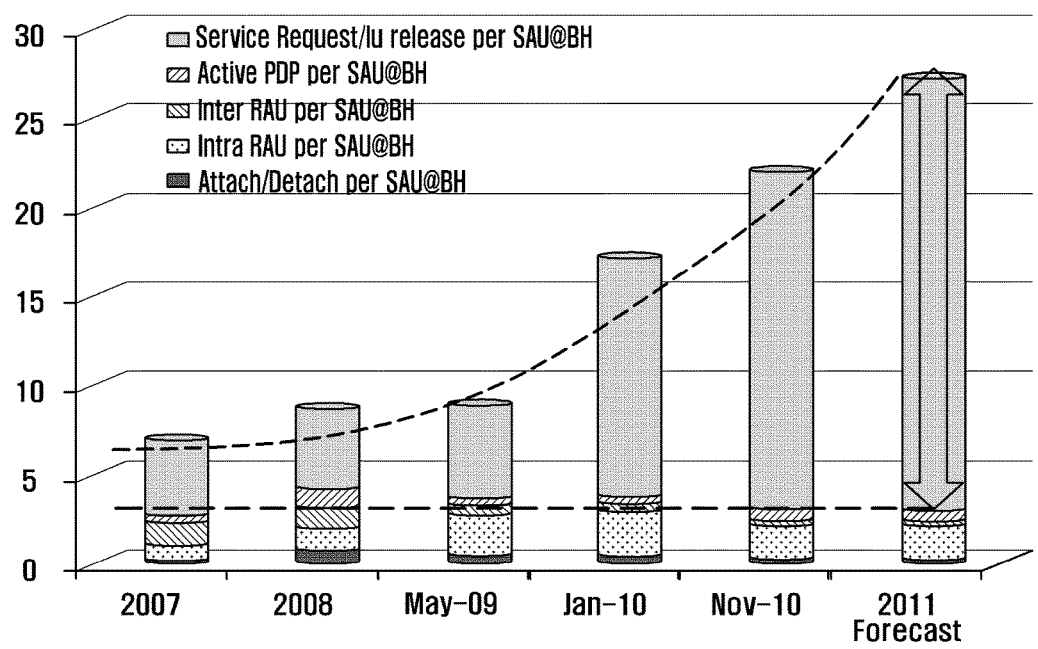
FIG. 3 is a graph illustrating an exemplary signaling overhead increment caused by state transition.

Exemplary embodiments of the present invention are described with reference to the accompanying drawings in detail. The same reference numbers are used throughout the drawings to refer to the same or like parts.

In an embodiment of the present invention, the device-triggering apparatus configures the packet filter of the serving gateway (SGW) of the mobile terminal to a level or time for device triggering and, if there is any device trigger request, controls the connection between the external server and the terminal according to the information configured to the packet filter. That is, an embodiment of the present invention proposes a method for configuring packet filter per application server and determining, at the mobile communication network, whether to transmit a downlink data notification based on the analysis of the packet filter when the corresponding application server requests for device trigger.

In an embodiment of the present invention, the packet filter may be configured as follows. First, the present invention proposes a method for configuring the packet filter with the tolerant level (or urgent level) and analyzing, when a device trigger is received, the packet filter of the corresponding application server to determine whether to transmit downlink data notification (first embodiment). Here, the urgent level may correspond to priority. Secondly, the present invention proposes a method for configuring the packet filter with the wait time and analyzing, when a device trigger is received, the packet filter of the corresponding application server to determine whether to transmit downlink data notification (second embodiment). Thirdly, the present invention proposes a method for configuring the packet filter with a plurality of tolerant levels (or urgent levels) and the wait times corresponding to the respective levels and analyzing, when a device trigger is received, the packet filter of the corresponding application server to determine whether to transmit downlink data notification. Fourthly, the present invention proposes a method for configuring the packet filter with the data buffer amount of the serving gateway (SGW) and analyzing, when a device trigger is received, the packet filter of the corresponding application server to determine whether to transmit the downlink data notification. Fifthly, the present invention proposes a method for configuring the packet filter with the load status of the MME and analyzing, when a device trigger is received, the packet filter of the corresponding application server to determine whether to transmit the downlink data notification. In the following, the description is mainly directed to the first embodiment of the first method and the second embodiment of the second method.

A description is made of the packet filter configuration method according to the first embodiment of the present invention.

The Long Term Evolution (LTE) network supports the always-on connectivity of the attached terminal. Accordingly, the terminal maintains, event in the idle state, S5 bearer (bearer between SGW and PGW) of the PDN connection and thus, if any downlink data addressed to the terminal is received, the SGW buffers the data and sends the terminal a downlink data notification to trigger paging. If the terminal transitions to the active state upon receipt of it, the mobile communication system forwards the received data to the terminal. At this time, the method of the first embodiment configures the urgent level of the acknowledgement corresponding to the downlink data while using the buffering function of the SGW. If the terminal is in the idle state in this state, the mobile communication system buffers the downlink data below a predetermined level and, if the downlink data exceeds the predetermined level, transmits a paging so as to process the acknowledgements to the server at a time when the operation state of the terminal transitions to the active state.

Figure 4:
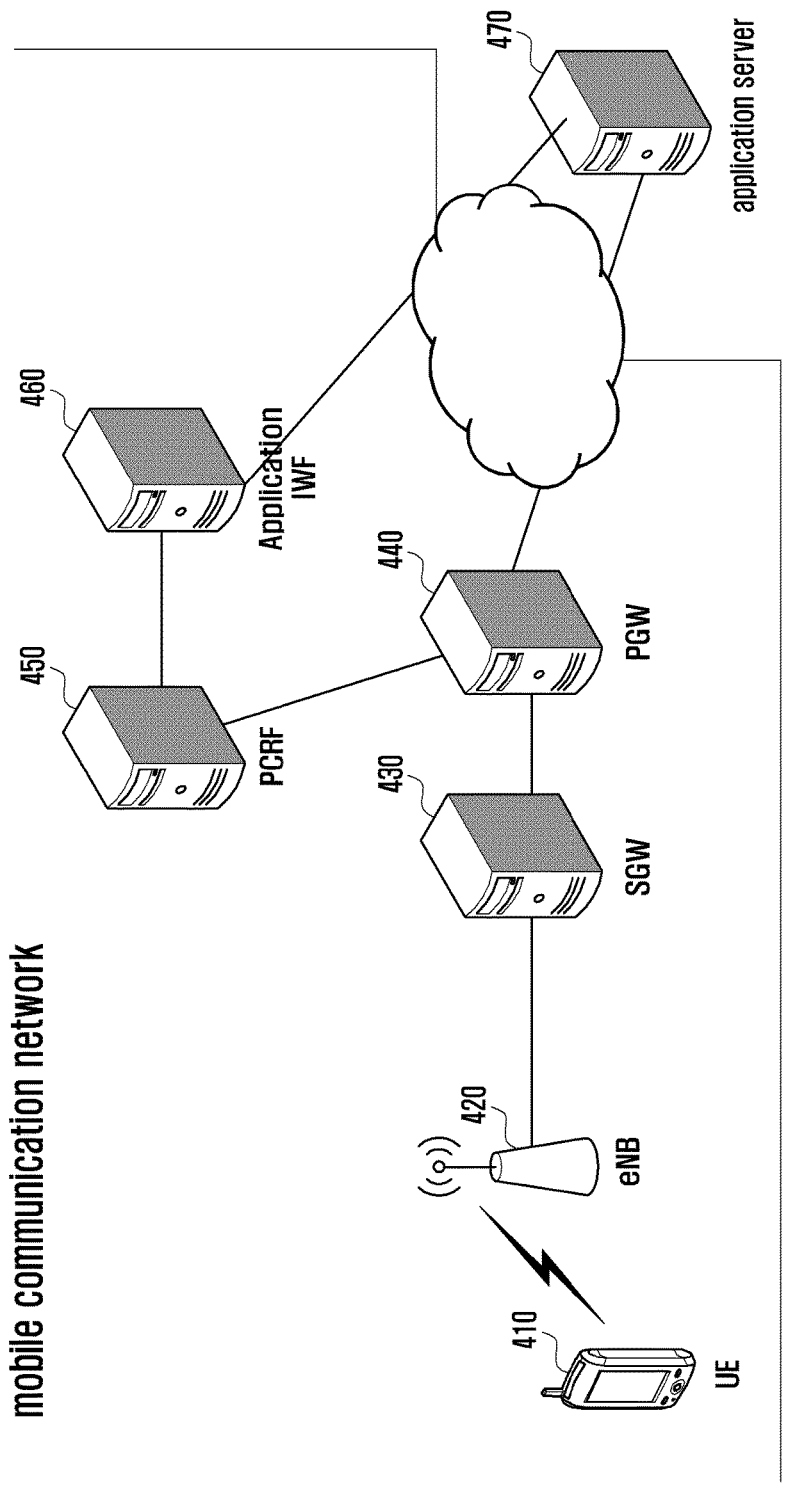
FIG. 4 is a diagram illustrating architecture of a mobile communication system according to an embodiment of the present invention.

FIG. 4 is a diagram illustrating architecture of a mobile communication system according to an embodiment of the present invention. Referring to FIG. 4, the application server 470 generates a device trigger registration request message including a device identifier (ID), a source address and port, and packet filter configuration information and transmits downlink data. Here, the device ID may be an external ID. The application Interworking function (IWF) 460 receives the device trigger registration request message from the application server 470 and sends the Policy and Charging Rules Function (PCRF) 450 the Policy and Charging Rule provision (PCRF) information including APN, source address and port, and packet configuration information received from the IWF 460. The PCRF 450 communicates with the Packet Data Network (PDN) Gateway (PGW) 440 to configure the default packet filter and sends the PGW 440 the PCRF information including the APN, source address and port, and packet configuration information received from the application IWF 460. The PGW 440 communicates the default packet filter to be configured at the SGW 430 and the packet filter information of the application server 470 with the PCRF 450. The SGW 430 configures the default packet filter and the packet filter of the application server 470, buffers the downlink packets from the application server 470, and analyzes the packet filter of the application server 470 and the default packet filter toe notify the UE of presence/absence of downlink packet. The evolved Node B (eNB) 420 establishes a radio link with the User Equipment (UE) 410 and controls the radio communication between the UE 410 and the mobile communication system including the SGW 430.

Here, the PGW 440, SGW 430, and MME (not shown) are the entities of the core network.

In the above-structured mobile communication system, the application IWF 460 receives the device trigger registration request including the UE ID and packet configuration information from the external application server 470 and forwards it to the PGW 440 via the PCRF 450. Then the SGW 430 configures the packet filter with the information on the application server 470 (src addr, src port) and packet filter information (urgent level, wait time, etc.) to adjust the state transition of the UE 410. Here, the wait time may be a valid period.

Figure 5:
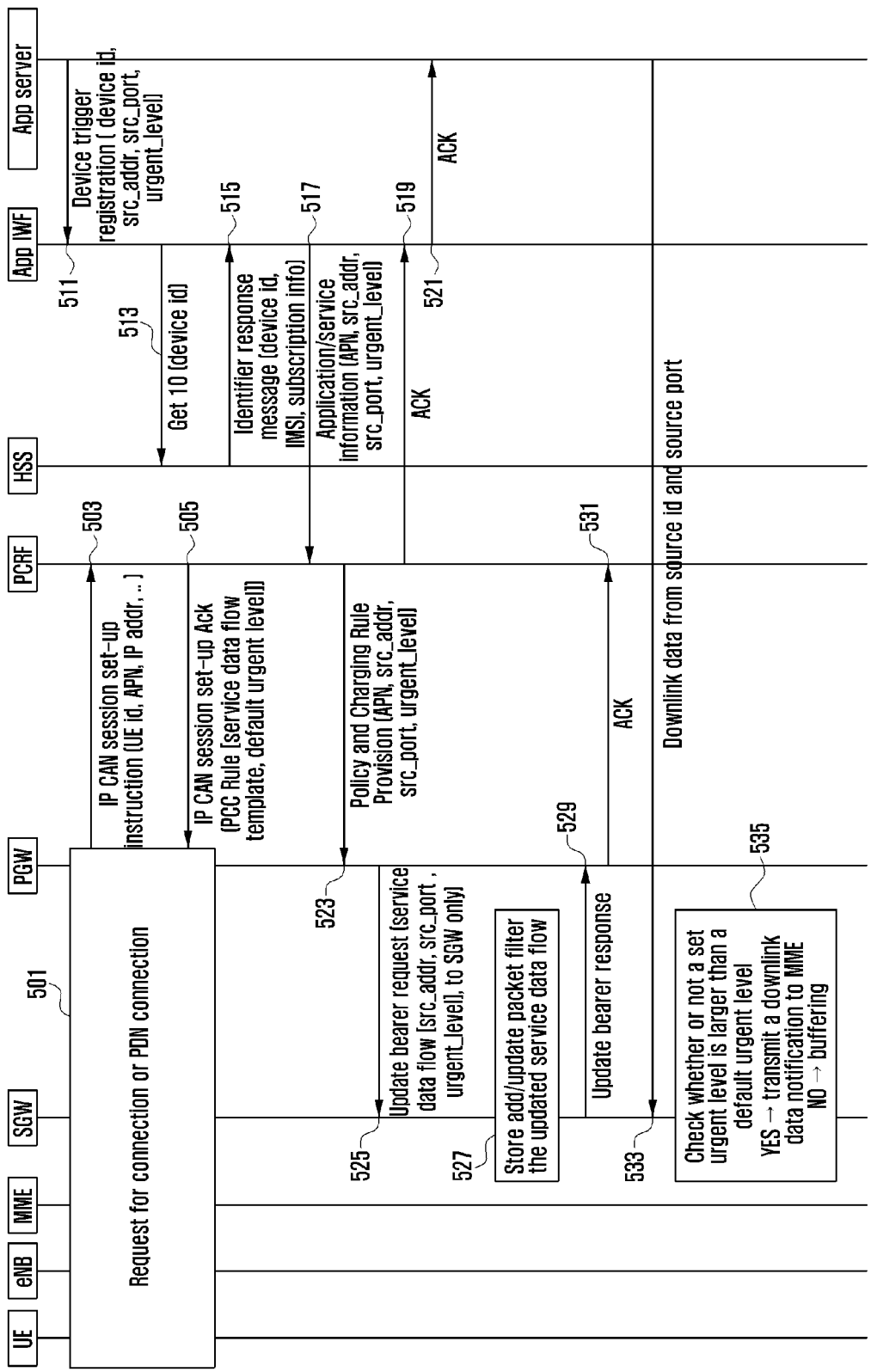
FIG. 5 is a flow diagram illustrating a procedure of controlling device trigger by configuring packet filter with urgent level according to the first embodiment of the present invention.

FIG. 5 is a flow diagram illustrating a procedure of controlling device trigger by configuring packet filter with urgent level according to the first embodiment of the present invention.

Referring to FIG. 5, the UE 410 may request for connection or PDN connection at step 501. In this state, the PGW 440 sends the PCRF 450 an IP Connectivity Access Network (CAN) session establishment indication, which includes UE Id, APN, IP address, etc., for policy and QoS configuration at step 503.

Upon receipt of the IP CAN session Establishment indication from the

PGW 440 at step 503, the PCRF 450 acknowledges the receipt of the IP CAN session Establishment with Policy and Charging Control (PCC) rule including service data flow template and default urgent level. That is, in the first embodiment of the present invention, the RRC rule is transmitted with the configuration of the default urgent level of the corresponding PDN connection. At this time, the default urgent level may be configured per PDN connection or bearer level. The default urgent level information is installed at the SGW 430 but not transferred to the UE 410.

In the above state, the application server 470 may configure the urgent level for use in device triggering. In this case, the Application Server 470 generates the device trigger registration request message (device trigger register) with the parameters including address (src_addr) and port (src_port) used by the server for communication with the UE and the urgent level value of the communication between the corresponding server and the UE to register the device trigger with the application IWF 460. At this time, the UE id may be a public id such as URI, FQDN, and MSIDSN. Then the application IWF 460 sends the Home Subscriber Server (HSS) a request including the device id as a parameter to check the International Mobile Subscriber Identity (IMSI) as the id used by MNO at step 513. Then the HSS sends the application IWF 460 a response device ID such as IMSI and subscription information at step 515. That is, the application IWF 460 acquires APN subscription information in addition to IMSI.

Afterward, the application IWF 460 sends the PCRF 450 the application/service information including address and port of the application server (src_addr and src_port), urgent level, and APN used by the UE in communication with the corresponding server based on the IMSI at step 517. At this time, the APN is selected based on the APN subscription information or operator configuration. The PCRF 450 sends the PGW 440 a PCC rule of the corresponding PGW which has been updated based on the information received from the application IWF 460 at step 523, the PCC rule including APN, src_addr, src_port, and urgent level. The PCRF 450 sends the application IWF 460 the Ack at step 519, and the application IWF 460 forwards the ACK to the application server 470 at step 521.

The PGW 440 sends the SGW 430 a service data flow including the urgent level received from the PCRF at step 525 (update bearer request (service data flow (src_addr, src_port, urgent level)) to SGW only), and the SGW 430 installs this (store add/update packet filter the updated service data flow) at step 527. Here, since the urgent level is the information which is not transmitted to the UE, the change of the urgent level information is terminated at the SGW. After configuring the packet filter with the urgent level of the application server 470 as described above, the SGW 430 sends the PGW 440 an update bearer response at step 529, and the PGW 440 sends the PCRF 450 the ack message at step 513.

After configuring the packet filter with the urgent level of the application server 470 at the SGW 430, if downlink data packet occurs at the application server 470, the downlink data packet is transmitted to the SGW 430 at step 533. Upon receipt of the downlink data packet, the SGW 430 checks whether the urgent level of the corresponding service data flow is higher than a default urgent level (check if the urgent level of src_addr, src_port is greater than default urgent level) and processes the corresponding data packet according to the comparison result at step 535. If the urgent level is lower than the default urgent level installed at step 505, the SGW 430 does not send the downlink data notification to the corresponding MME and buffers the received data packet at step 535. Afterward, in order to transmit the buffered data to the UE 410 at the timing of the default urgent level, a paging is transmitted. In an exemplary case of using a default urgent level timer, the default urgent level timer starts at the receipt of the data packet and, if the timer expires, the SGW pages the UE 410 to transmit the buffered data packet. Otherwise if the urgent level of the received packet is higher that the default urgent level installed at step 505, the SGW 430 sends the corresponding MME a downlink data notification to trigger paging. If the connection is established, the mobile communication system transmits the received data packets to the UE. At this time, if there is buffered data packet, the buffered data packets are transmitted together.

Here, the urgent level may be reconfigured when the application server 470 performs the device trigger registration again since the initial configuration.

As described above, the urgent level of the downlink data is configured while using the buffering function of the SGW 430 in the first embodiment of the present invention. if the UE in the idle state receives the downlink packet, the mobile communication system compares the urgent level registered by the application server with the default urgent level of the UE and, if it is equal to or lower than the urgent level, buffers the downlink data and, otherwise if it is higher than the default level, pages the UE to transition to the active state and transmits the downlink packet.

The second embodiment of the present invention proposes a method for configuring the packet filter with the wait time and processing downlink data packet based thereon. That is, the second embodiment of the present invention relates to the method of configuring the wait time instead of the tolerant level (urgent). In the device trigger registration, the application server 470 set the wait time to the maximum value available after the trigger. If the application server 470 transmits downlink data after the wait time configuration, the SGW 430 operates as follows depending on the state of the corresponding UE. First, if there is no data buffered at the SGW 430, the SGW 430 configures the wait time of the arrived data as the timer for transmitting the downlink data notification. Secondly, if there is data buffered at the SGW 430 and if the residual time of the configured downlink data notification timer is shorter than the wait timer of the arrived data, the SGW 430 buffers the corresponding data and, otherwise if the residual time of the configured downlink data notification timer is longer than the wait timer of the arrived data, resets the timer to the wait time of the corresponding timer and buffers the data. Thirdly, if the downlink data notification timer expires, the SGW 430 sends the MME the downlink data notification to trigger paging.

Figure 6:
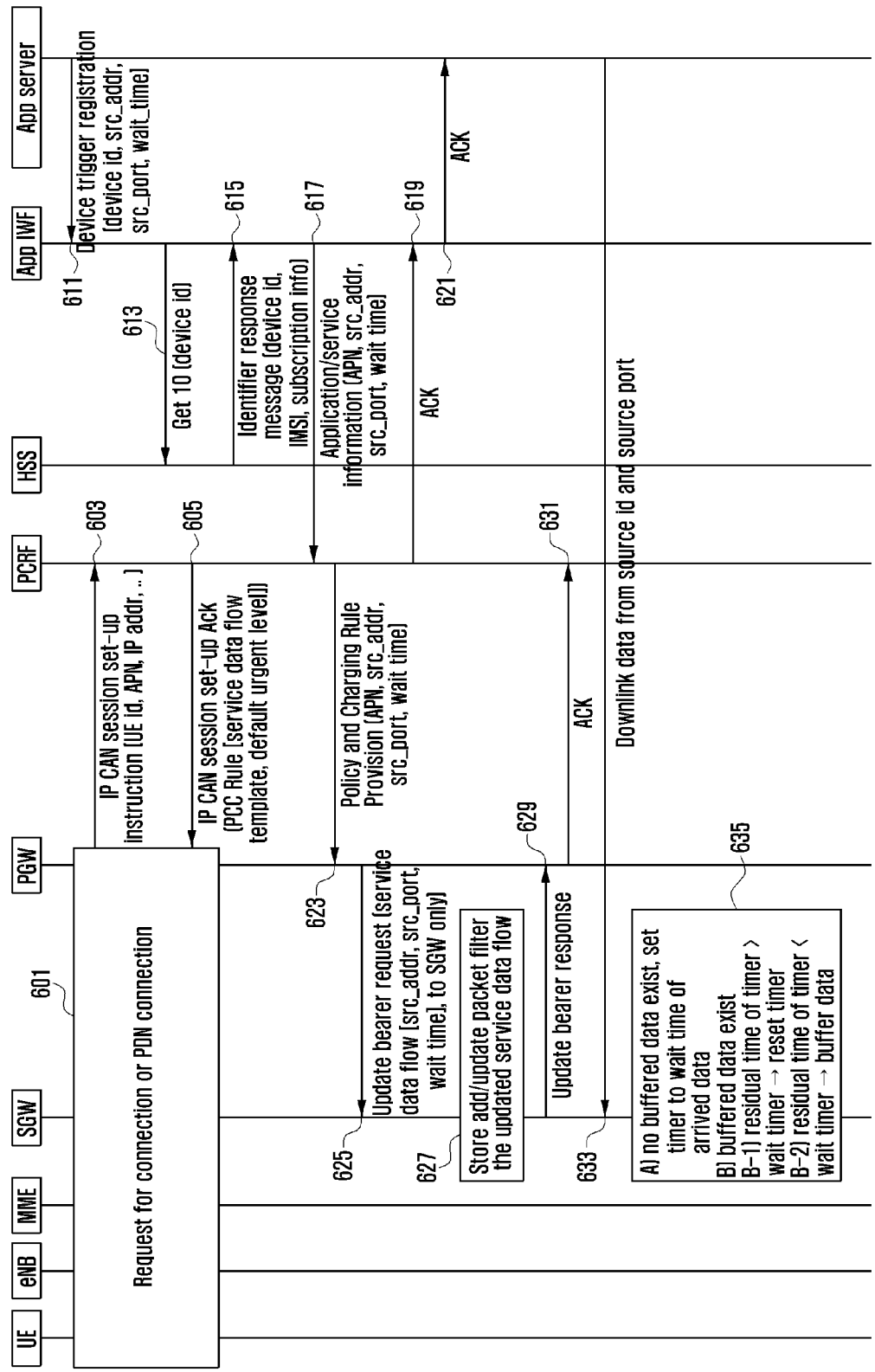
FIG. 6 is a flow diagram illustrating a procedure of configuring the packet filter of the SGW with the wait timer and processing the data packet received since then according to the second embodiment of the present invention.

FIG. 6 is a flow diagram illustrating a procedure of configuring the packet filter of the SGW 430 with the wait timer and processing the data packet received since then according to the second embodiment of the present invention.

Referring to FIG. 6, if the UE requests for Attach or PDN connection at step 601, the PGW 440 sends the PCRF 450 an IP CAN session establishment indication message including UE id, APN, and IP address for configuring policy at step 603. Upon receipt of the IP CAN session establishment indication from the PGW 440, the PCRF 450 sends a PCC Rule in reply at step 605.

The application server 470 generates the device trigger using the parameters including the address and port information used in communication with the UE, wait time value of the communication between the corresponding server and the terminal, and the UE id and registers the device trigger with the application IWF 460 at step 611. The UE id used at this time may be a public id such as URI, FQDN, and MSIDSN. Then the application IWF 460 sends the HSS a request including the device id as a parameter to check the IMSI as the id used by MNO at step 613 and receives IMSI and APN subscription information from the HSS at step 615.

Afterward, the application IWF 460 generates application/service information including the application server address and port, wait time, and APN used by the UE in communication with the corresponding server and registers the information with the PCRF 450 at step 617. At this time, the APN is selected based on the APN subscription information or operator configuration. The PCRF 450 generates the PCC rule updated based on the information received from the application IWF 460 and sends the PGW 440 the PCC rule at step 623. The PCRF 450 sends the application IWF 460 an ack message at step 619, and the application IWF 460 forwards the ack message to the application server 470 at step 621.

The PGW 440 sends the SGW 430 a service data flow including the wait time received from the PCRF 450 (update bearer request (service data (src_add, src_port, wait time)) to SGW only) at step 625, and the SGW 430 updates the packet filter with the received update service data (store add/update packet filter the updated service add flow) at step 627. Here, since the wait time is the information which is not transmitted to the UE, the change of the wait time information is terminated at the SGW. Afterward, the SGW 430 sends the PGW 440 an update bearer response at step 629, and the PGW 440 sends the PCRF 450 the ack message at step 633.

If a downlink data packet occurs at the application server 470 after updating the packet filter of the SGW 430, the SGW 430 receives the downlink data packet at step 633. Upon receipt of the downlink data packet, the SGW 430 checks and processes the wait time configured for the corresponding service data flow at step 635. At this time, if there is no data buffered at the SGW 430, sets the downlink data notification timer to the wait time (No buffered data: set timer to wait time of arrived data). If there is data buffered, the SGW 430 processes the received data packet as follows. First, if the residual time of the configured downlink data notification timer is shorter than the wait timer of the arrived data, the SGW 430 buffers the corresponding data (remaining timer<wait timer→just buffering data). Secondly, if the residual time of the configured downlink data notification timer is longer than the wait timer of the arrived data, the SGW 430 resets the downlink data notification timer to the wait time of the corresponding data and buffers data (remaining timer>wait timer→reset downlink data notification timer). If the downlink data notification timer configured at the SGW 430 expires, the SGW 430 sends the MME the downlink data notification. Here, the wait time may be rest when the application server 470 performs the device trigger registration again since the initial setting.

In an embodiment of the present invention, the packet filter of the SGW 430 may be configured with the features of the first and second embodiments. In this case, the application server 470 generates device trigger registers for configuring a plurality of urgent levels and wait timers corresponding to the levels, and the SGW 430 configures the packet filters with the urgent levels and corresponding wait times received through the above procedure. The level for processing the downlink data packet may be selected by the application server 470 or the SGW 430. In the case that the application server 470 processes, the application server 470 sends the downlink packet data along with the level information.

When receiving the downlink data packet, the SGW 430 may determine whether to send the device triggering based on the load state of the MME. That is, the SGW 430 determines whether to deliver data packet based on the load at the MME and the level of the UE to which the data packet is addressed. For example, if the load of the MME is great, the data packet transmission may be permitted to the UE with high QoS level. The SGW 430 also may determine whether to send the device triggering depending on the size of the buffered data packet. That is, the SGW 430 buffers the data packets and, if the amount of the data packets exceeds a predetermined size, triggers the corresponding UE to control the connection of the UE. In an embodiment of the present invention, it is possible to use at least two packet filter configuration methods selectively in configuring the packet filter of the SGW 430.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method of triggering a device in a mobile communication system by an apparatus, the method comprising:
receiving, by a transceiver of the apparatus, a device trigger request message from an application server, the device trigger request message comprising a priority and a valid period of a device trigger request;
processing the device trigger request based on the priority and the valid period in the device trigger request message;
transmitting, by the transceiver, a subscriber information request message to a home subscriber server (HSS) in response to the device trigger request message;

receiving, by the transceiver, a subscriber information response message from the HSS in response to the subscriber information request message; and based on the receiving of the subscriber information response message from the HSS, transmitting, by the transceiver, the priority and the valid period via a policy and charging rules function (PCRF) and a packet data network gateway (PGW) to a serving gateway (SGW), wherein the SGW determines whether to transmit or buffer downlink data packets based on the priority and the valid period upon receipt of the downlink data packets from the application server.

2. The method of claim 1, further comprising transmitting service information of the application server to the PCRF based on the subscriber information response message.

3. The method of claim 1, wherein the device trigger request message further comprises an external ID.

4. The method of claim 1, wherein the subscriber information response message comprises an international mobile subscriber identity (IMSI).

5. An apparatus for triggering a device in a mobile communication system, the apparatus comprising:
a transceiver configured to:
receive a device trigger request message from an application server, the device trigger request message comprising a priority and a valid period of a device trigger request,
process the device trigger request based on the priority and the valid period in the device trigger request message,
transmit a subscriber information request message to a home subscriber server (HSS) in response to the device trigger request message,
receive a subscriber information response message from the HSS in response to the subscriber information request message, and
based on the receiving of the subscriber information response message from the HSS, transmit the priority and the valid period via a policy and charging rules function (PCRF) and a packet data network gateway (PGW) to a serving gateway (SGW),
wherein the SGW determines whether to transmit or buffer downlink data packets based on the priority and the valid period upon receipt of the downlink data packets from the application server.

6. The apparatus of claim 5, wherein the transceiver is further configured to transmit service information of the application server to the PCRF based on the subscriber information response message.

7. The apparatus of claim 5, wherein the device trigger request message further comprises an external ID.

8. The apparatus of claim 5, wherein the subscriber information response message comprises an international mobile subscriber identity (IMSI).

* * * * *